United States Patent Office 3,532,495
Patented Oct. 6, 1970

3,532,495
ELECTROPHOTOGRAPHIC DEVELOPING PROCESS FOR COLOUR IMAGES
Walter Simm, Opladen, and Otto Kock and Gerhard Heyl, Cologne-Stammheim, Germany, assignors to Agfa-Gevaert Aktiengesellschaft, Leverkusen, Germany, a corporation of Germany
No Drawing. Filed May 13, 1966, Ser. No. 549,808
Claims priority, application Germany, May 21, 1965,
A 49,273
Int. Cl. G03g 13/22
U.S. Cl. 96—1.2                                3 Claims

ABSTRACT OF THE DISCLOSURE

The electrophotographic production of multi-colored images involving exposing a charged photoconductive layer to form an electrostatic image in which aerosol dye development of the image uses a dye solvent which evaporates from the dye during the movement of the aerosol to the photoconductive layer. Thus solid particles of dye are deposited and distributed in image formation. The solvents are selected and the evaporation carried out so that the dye is deposited in dry condition on the electrophotographic layer. In this way the application of the dye does not deteriorate the photoconductive layer.

Also a film-forming material may be dissolved in the solvent and the dyes distributed in the film-former so that the film-former with the dyes absorbed in it remain on the surface of the photoconductive layer.

---

This invention relates to an electrophotographic developing process for the production of coloured images by means of a liquid aerosol. The process is carried out by depositing dye particles in the dry state on the layer to be developed and then spraying them with an aerosol comprising a solvent for the developing dyes.

Multi-coloured images of a coloured original can generally be produced from colour separating records. Multi-coloured images can also be electrophotographically produced on this principle, if, for example, an electrophotographic layer is electrically charged in the usual way by corona discharge, exposed to form an image through a separation filter and then developed with an electrically charged aerosol dye. This procedure is successively repeated for a number of colour separating record, using red, green and blue filters, and each partial image is developed on the same layer with the corresponding subtractive basic dyes, cyan, purple and yellow. Since half-tone images are involved in most cases, it is of advantage to use an aerosol of liquid or solid dyes for development. The processes described in German patent specification Nos. 1,164,829, 1,172,955 and 1,187,134, are particularly suitable because, in their case, image development can be carried out in fairly simple and inexpensive apparatus by virtue of the electrostatic atomisation of dye solutions. The apparatus used for this purpose comprises an atomising electrode and a gridlike developing electrode arranged slightly above the electrophotographic layer, the object of which is to intensify the electrostatic image field and to retain those aerosol particles which are not required for development.

If liquid dye particles of a number of different dyes are repeatedly applied one above the other onto an electrophotographic layer by an aerosol process, the electric properties of the layer deteriorate when the dye solution penetrates into the layer or causes it to swell, or even of it only wets it. Operations such as these generally increase the dark discharge rate of the layer and impair its ability to hold a charge, whilst reducing its sensitivity to light. As a result, the succeeding colour components are not applied under the same conditions as the earlier colour components, with the result that the image is deformed due to non-uniform colouring, incorrect colour reproduction and general weakening of colour.

Water is not suitable for use as a solvent which does not loosen the layer, because aqueous solutions cannot be atomised sufficiently finely. This difficulty does not arise in cases where the powder-cloud developing process is used. In these cases, however, it is extremely costly and impractical to prepare and treat uniformly thick and electrically charged dry dye powders.

It has now been found that the disadvantages referred to above can be obviated and multi-colour images of outstanding quality obtained if aerosol development is carried out by evaporating the solvent from the aerosol obtained by atomisation of the coloured developer solution during the movement of the aerosol from the atomiser to the photoconductive layer to be developed, so that the dye is deposited on the photoconductive layer in the form of solid particles distributed in image formation. The optionally multi-coloured, developed photoconductive layer is then sprayed uniformly or imagewise with a solvent for the developer dyes.

The process according to the invention is particularly suitable for developing processes in which the developer liquid is electrostatically atomised and deposited by a developing grid arranged between the atomising electrode and the photoconductive layer.

In order to deposit the developer dyes in a dry condition, the solvents for the dye solution to be atomised are so selected, depending upon their specific resistivity and their vapour pressure, and the duration-time of the aerosol in the space between the layer and the developing grid is so adjusted, that the dye is deposited in a dry condition on the electrophotographic layer. In cases where the developer liquid is electrostatically atomised, the duration-time of the aerosol is determined by the distance separating the atomising electrode from the grid, and may be adjusted by altering this distance. The specific resistivity of the solution determines the size of the droplets and hence the rate at which the solvent evaporates.

Suitable solvents for the developer dyes include liquids whose vapour pressure at 20° C. is not less than 3 mm. Hg, i.e. those with a boiling point from 50 to 200° C. at normal atmospheric pressure. Liquids with a specific electric resistivity of $10^3$ to $10^5$ ohms-cm., preferably $5 \times 10^3$ to $5 \times 10^4$ ohms-cm., should be used for electrostatic atomisation.

The distance separating the atomising electrode from the developing grid should be from 50 to 500 mm., preferably from 60 to 200 mm.

Suitable solvents include, for example, ethylene glycol monoethyl ether, dimethyl formamide, cyclohexanone, glycerol-1,3-diethyl ether, dimethyl sulphoxide and ethanol.

Suitable dyes include tri-m-tolyl-p-rosaniline monosulphonic acid

Astrablau 3 R, highly concentrated (described in Friedl, XII/209)
Astraneufuchsin, concentrated (Shultz-Farbstofftabellen, 7th Edition, No. 782)
Irisolechtgelb GRE (C.I. 18690) and
Zaponechtgelb CGG (C.I. 20450).

If deposited dry, the dye initially loses some of its tinting strength, in consequence of which the colours fade and become dull. In addition, the strength of the bond between the layer and the supporting base is so weak that this colour image can be wiped off. In order to restore saturation and improve bond strength, it is sufficient to spray the completed, dry colour image with a solvent or solvent mixture in which all the dyes applied are soluble.

For this purpose, it is preferred to use solvents in which the vehicle of the photoconductive layer is insoluble or at most only sparingly soluble. The same solvents as those used to spray the dye are mainly suitable for this purpose. By contrast, the conditions under which the dyes are atomised must be controlled in such a way that the solvent is still fluent when it reaches the layer. The liquid aerosol of the solvent may be uniformly distributed over the entire surface of the layer at this stage. Since the solvent particles of the aerosol do not necessarily have to be charged for spraying, any type of apparatus by means of which the liquid can be atomised sufficiently finely, for example nozzles through which the dye is atomised by means of compressed air, may be used for carrying out these stages of the process. Electrostatic atomisers are particularly suitable because charged liquid droplets are deposited particularly rapidly and completely.

In a preferred embodiment of the invention, a film-former is dissolved in the solvent for the dyes at this stage of the process and sprayed with it so that the image dyes are not only dissolved but at the same time are distributed in the film-former. As a result of this step, the fastness to light of many dyes is very considerably increased. Suitable film-formers include, for example, inorganic or organic cellulose esters such as cellulose acetates, cellulose propionates or cellulose butyrates, shellac or mixtures thereof.

The choice of the film-forming material will be governed by the type of photoconductive layer and the type of image dyes used. It is preferred to use those in which the image is soluble. In other words, the dye of the ultimate image is intended to be dissolved to the greatest possible extent in the film-former applied by spraying.

Both the saturation and the brilliance of the dyes are improved by the process according to the invention. Errors in development caused by loosening and swelling of the photoconductive layer, are eliminated by applying the process stages referred to above, i.e. by atomising the liquid dye, dry development of the partial images, re-dissolution and fixing of the dyes in the completed, dry colour image preferably absorbed in a film formed on the ZnO-vehicle layer. Further errors such as breakdowns emanating from charging, or spots caused by irregular discharge of the layer surface during exposure, as a result of which the intermediate tones in particular appear extremely irregular and unnatural in the image, can be eliminated by screened, image-wise exposure, as known per se. Gravure-printed screens in the form of intersecting lines or brick-pattern screens are particularly suitable. The gradation of the image may also be favourably influenced by suitably arranging the screen sheets or screen plates.

It is possible, by virtue of the process stages referred to above, to obtain outstanding colour images on highly photosensitive papers by way of electrostatic charging images.

EXAMPLE

Preparation of the electrophotographic layer 450 g. of a photoconductive zinc oxide are ground for 2 hours in a ball mill with 320 g. of a film-forming phenylmethyl polysiloxane resin (60% by weight in toluene), 500 g. of toluene, and then applied to an aluminium-lined paper support or to a transparent plastics film, for example a cellulose acetate film, with a covering of aluminium applied by vapour-deposition.

Before casting, the following sensitizing dyes were also added to the dispersion: Bromphenol blue, rose bengal and fluorescein.

Processing

The photoconductive layer is uniformly charged in the usual way by means of a corona discharge and the green colour separation record of a transparent, multi-coloured original is initially exposed using a conventional separation filter. The image is then developed with a purple dye using an atomiser of the type described in German patent specification No. 1,172,955. The developer solution had the following composition:

25 parts by weight of a purple dye (No. 782 in Schultz-Farbstofftabellen, 7th Edition)
75 parts by weight of ethylene glycol monoethyl ether.
Specific resistivity of the solution: $2 \times 10^4$ ohms-cm.
Distance between atomising electrode and developing grid: 150 mm.

The red colour separation record is then prepared as described above by repeated charging, exposure and development. The developer solution comprised 30 parts by weight of a phthalocyanine dye of the type described in German patent specification No. 1,061,010 and 70 parts by weight of ethylene glycol monoethyl ether: specific resistivity: $1.1 \times 10^4$ ohms-cm.; distance between the atomising electrode and the developing grid 150 mm. (applies to all components).

The blue colour separation record is then prepared as described above using a developer solution of the following composition:

30 parts by weight of a yellow dye (C.I. 18690)
12 parts by weight of a ethylene glycol monoethyl ether
58 parts by weight of cyclohexanone
Specific resistivity: $1.8 \times 10^4$ ohms-cm.
Distance between the atomising electrode and the developing grid: 150 mm.

The photoconductive layer now carries a multi-coloured image, the dyes adhering to the surface of the layer in a dry state. In order to improve both the optical and the mechanical properties of the image, the layer is sprayed in accordance with the invention with a 10% by weight solution of shellac in ethanol. The electrostatic atomiser described in the foregoing is used to spray the shellac solution.

Brief drying in heated air hardens the resulting varnish coat. A wiping-resistant, tinctorially strong and brilliant coloured image of the original is obtained.

We claim:
1. A process for the production of electrophotographic multi-colored images consisting of preparing a solution of a cyan, purple or yellow image dye in an organic solvent having a boiling point between 50 and 200° C. at normal atmospheric pressure and a specific selective resistivity of $10^3$ to $10^5$ ohms cm., charging a photoconductive layer, exposing said photoconductive layer to form an electrostatic image through the corresponding color separation filter for said dye, atomizing said solution into droplets between an atomizing electrode and a developing grid, said grid being positioned between said atomizing electrode and said exposed photoconductive layer and spaced from 60 to 500 mm. apart from said atomizer electrode, moving the atomized droplets from the grid to the photoconductive layer while allowing all of said solvent to evaporate from said atomized droplets during the movement of said droplets from said electrode to said photoconductive layer to form dry particles from said droplets, depositing said dry particles on said photoconductive layer so as to develop the image of said ex- posed photoconductive layer, and repeating the above procedure twice, employing different dye solutions and the corresponding color separation filters to produce a multicolored image.

2. The process according to claim 1 including the step of spraying the developed photoconductive layer with a solvent for the deposited dyes to finish the final copy.

3. A process as claimed in claim 2, wherein the sprayed solvent contains a film-forming polymeric material which absorbs the dyes.

References Cited

UNITED STATES PATENTS

| | | | |
|---|---|---|---|
| 2,716,826 | 9/1955 | Huebner | 41—1 |
| 3,060,021 | 10/1962 | Greeg | 96—1 |
| 3,140,160 | 7/1964 | Carlson | 34—155 |
| 3,150,976 | 9/1964 | Johnson | 96—1 |
| 3,228,608 | 1/1966 | Simm et al. | 239—15 |
| 3,288,624 | 11/1966 | Clark | 117—21 |
| 3,330,683 | 2/1967 | Simm et al. | 117—37 |

GEORGE F. LESMES, Primary Examiner

J. C. COOPER III, Assistant Examiner

U.S. Cl. X.R.

96—1; 117—17.5, 37; 118—637; 252—62.1

PO-1050
(5/69)

UNITED STATES PATENT OFFICE
CERTIFICATE OF CORRECTION

Patent No. 3,532,495            Dated October 6, 1970

Inventor(s) Walter Simm et al

It is certified that error appears in the above-identified patent and that said Letters Patent are hereby corrected as shown below:

Column 1, line 4, the second inventor's name should read: "Otto Koch".

Signed and sealed this 23rd day of March 1971.

(SEAL)
Attest:

EDWARD M. FLETCHER, JR.          WILLIAM E. SCHUYLER, JR.
Attesting Officer                  Commissioner of Patents